March 16, 1926.
C. O. McBRIDE
1,576,527
MOLDING
Filed May 8, 1923
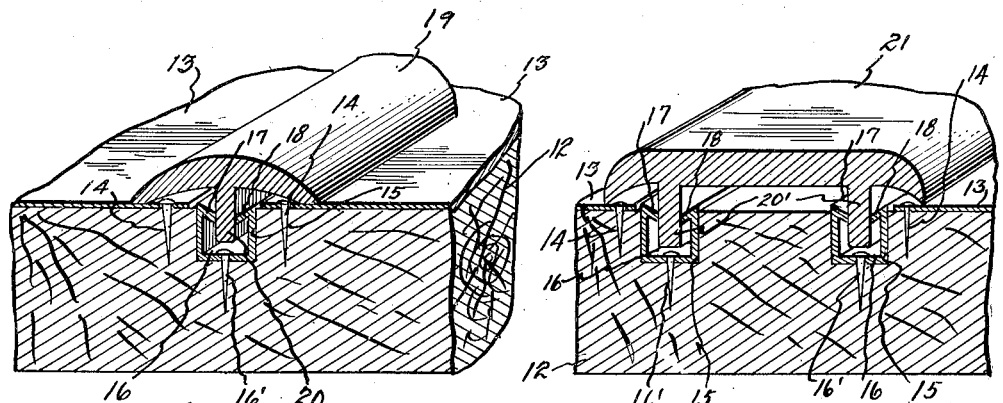
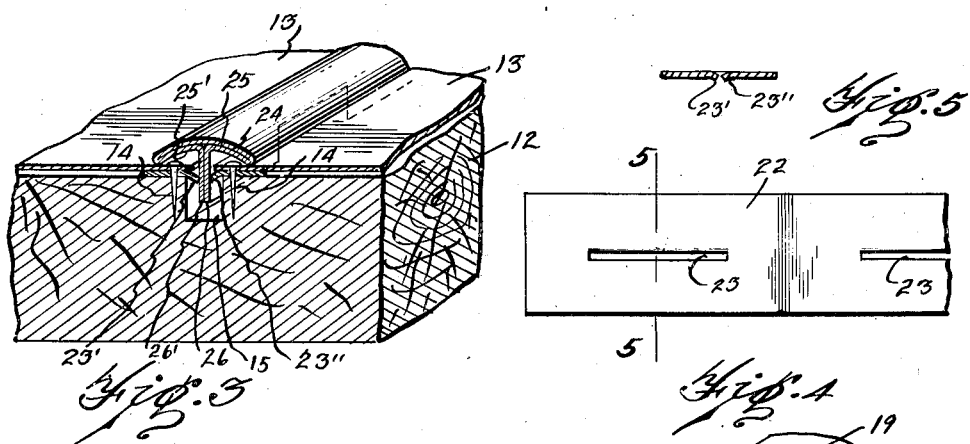
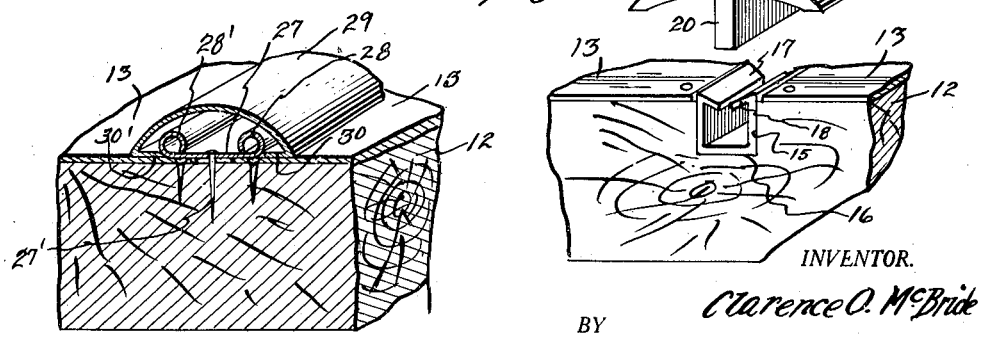
INVENTOR.
Clarence O. McBride
BY
ATTORNEY.

Patented Mar. 16, 1926.

1,576,527

UNITED STATES PATENT OFFICE.

CLARENCE O. McBRIDE, OF DETROIT, MICHIGAN.

MOLDING.

Application filed May 8, 1923. Serial No. 637,585.

*To all whom it may concern:*

Be it known that I, CLARENCE O. McBRIDE, a citizen of the United States, and residing at Detroit, in the county of Wayne and State of Michigan, have invented a new and useful Improvement in a Molding, of which the following is a specification.

My invention relates to molding which is used to conceal the means used for attaching trimming, panels and the like to a body on which they are attached and is particularly adapted for use in concealing the nails or other attaching means which are used to secure the trimming or panels to an automobile body. The invention resides in providing a molding of novel structure and also in providing means for attaching the molding to the body which is novel and which will serve to retain the molding in its mounted position in a firm and well attached condition.

One object of the invention is the provision of a molding so constructed as to be provided with a projection which is adapted to engage retaining means so as to allow the attachment of the molding over the objects to be concealed without the necessity of using any perforating means driven or otherwise passed through the molding.

Another object of the invention is the provision of means adapted for engagement with a portion of the molding in such a manner as to bind the molding in its mounted position, said means being concealed by the molding.

Another object of the invention is the provision of means for engaging the molding to hold the same in its mounted position and so constructed that any attempt at removal of the molding will serve to bring the engaging means into closer relation and therefore into firmer engagement with the portion of the molding engaged.

Another object of the invention is the provision of a molding having a tongue adapted to project into a groove formed in the body upon which it is to be mounted and means positioned within the groove for engaging and securely holding the tongue in mounted position.

Other objects will appear hereinafter.

The invention consists in the combination and arrangement of parts hereinafter described and claimed.

The invention will be best understood from a reference to the accompanying drawings which form a part of this specification and in which, Fig. 1 is fragmentary perspective view of the invention showing the end in section, Fig. 2 is a perspective view of a modified form of the invention showing the end in section, Fig. 3 is a perspective view of the invention in a modified form showing the end in section, Fig. 4 is a plan view of the blank used in the form shown in Fig. 3, Fig. 5 is a sectional view taken on substantially line 5—5 of Fig. 4, Fig. 6 is a fragmentary perspective view of the form shown in Fig. 1, with the molding in disengagement with the retainer, and, Fig. 7 is a fragmentary perspective view of another modified form of the invention showing the end in section.

Throughout the various forms shown, excepting that shown in Fig. 7, the molding is provided with a projection which is adapted to engage between two gripping members, forcing the members inwardly of a groove formed in the body of the material upon which the molding is mounted so that the gripping members are inclined toward the face of the projection and carried beyond center. As the projection of the molding is attempted to be withdrawn these gripping members which are in close engagement with the face of the projection are attempted to be moved outwardly of the groove. As this movement is attempted the gripping members, because they have been moved beyond center are strained toward center again, thus bringing the members into still closer engagement with the face of the projection and rendering the removal of the projection from between the gripping members practically impossible. The operation of the gripping members with the projection is on the principle of the toggle, the projection of the molding serving as one point of connection and the ends of the flanges used utilizing their integral connection as the other end, and for the purposes of this application such an arrangement may be termed a toggle connection between the gripping members and the molding.

In the use of the invention on automobile bodies it serves to cover up the nail or securing means used for attaching the trimming or panels to the body of the car. In the form shown in Fig. 1 and Fig. 6, the panels 13 are shown attached to the body 12 by means of nails 14 which it is desired to cover. A groove 15 is formed in the body and is lined with a trough shaped metallic lining 16 secured in the groove by means of the nail 16'. The upper ends of the side walls of this trough shaped member are turned inwardly to form flanges or gripping members 17 and 18 which are inclined toward the base of the trough shaped lining. The molding 19 which is used to cover up the nails 14 is provided centrally with a tongue or projection 20. When the upper ends of the side walls of the lining are turned inwardly they are not inclined to the base of the lining a sufficient distance to allow the projection 20 to pass between them but are so inclined as to allow a less space between them than would be required by the projection 20. When the molding is placed over the groove the projection is forced downwardly against the gripping members 17 and 18 so as to force these members into a greater incline relatively to the base of the trough. The metal of which this lining is made is provided with sufficient resiliency so that when the gripping members are forced inwardly by the projection they have a tendency to spring back to their normal position and thus they are always in close or gripping engagement with the projection. When it is attempted to remove the projection from the groove these gripping members are tending to move outwardly with the projection, their engagement therewith being so close and tight as to prevent their riding over the surface of the projection. The result is that as the tongue is attempted to be withdrawn these gripping members are brought into still closer engagement, owing to their toggle action, and the removal of the projection from the groove becomes practically impossible. It will be apparent that the projection may be provided with corrugations or even with shoulders, but such an arrangement is within the purview of this application and is intended to be covered with the attached claim.

In the form shown in Fig. 2 the operation is the same as already described, but I have shown a cast molding provided with a pair of projections or tongues 20'.

It is sometimes desirable and often necessary to have the groove formed in the body of very narrow dimensions and to provide a molding which will operate in a very narrow groove I have devised the form shown in Fig. 3. As shown in this view the panel is attached at opposite sides of the groove 15 which is very narrow and unlined. As shown in this view the groove does not extend along the full width of the material 12 but is interrupted to form a series of pockets or grooves 15. Positioned between the panels 13 and the material 12, so as to overlie the grooves or pockets is a sheet of metal 22, provided at intervals to correspond with the grooves or pockets with slits 23, the edges 23' and 23" of these slits being inclined slightly toward the base of the grooves. The molding which is preferably made from a stamping comprises a main body portion 24 having at opposite sides the doubled over portions 25 and 25', the ends 26 and 26' of which are angularly turned so as to project into the grooves when mounted on the material 12. As shown in Fig. 3 these members 26 and 26' are not continuous throughout the length of the molding but are interrupted to correspond with the grooves or pockets. These members 26 and 26' are forced into the grooves or pockets so as to incline the members 23' and 23" out of their normal position and to bring them into close engagement with the members 26 and 26', as already described for the forms shown in Figs. 1 and 2.

In Fig. 7 I have shown a form of molding and means for attaching the same, in which no groove or pocket is necessary. Mounted upon the panels 13, so as to overlie the edges thereof and cover up the attaching means is a metallic strip 27 attached by nails 27'. The ends of this strip are curled to form knuckles 28 and 28'. The molding comprises a main body, shaped as desired, and having the ends thereof turned angularly to form flanges 30 and 30' which are integral with the main body 29. When the member 27 is secured to the material 12, the flanges of the molding are forced over the curled portions 30 and 30'. The ends of the flanges then snap in under these curled portions and the body 29 thus is securely attached.

In this way a simple and efficient means is provided for attaching the molding to the material upon which it is desired to mount it and the operation is one which is quick and in which the labor cost is reduced to a minimum.

While I have illustrated and described the preferred forms of structure I do not wish to limit myself to the precise forms shown but desire to avail myself of such variations and modifications as come within the scope of the appended claim. Among some of the changes which suggest themselves at the present time is the forming the strip shown in Fig. 4 out of two separate pieces and nailing one piece at each side of the pockets formed in the material. Another change would be the forming of the molding together with the tongue 20 out of wood, as it is apparent that the method of attaching the molding may be used on various objects and may be used for interior work in buildings, where it would be desirable to form the molding from other material than metal.

Having thus described my invention what I claim as new and desire to secure by Letters Patent is:

In combination, a trim molding and a body having a groove therein; said molding having a tongue projecting therefrom and adapted to project into the groove; a lining for said groove; gripping members formed on said lining adjacent the upper end thereof, and spaced apart at their edges, when in alignment, a less distance than the thickness of said tongue, said members being inclined inwardly of said groove and in engagement with said tongue when the same is passed between said members.

In testimony whereof I have signed the foregoing specification.

CLARENCE O. McBRIDE.